United States Patent
Wille

(10) Patent No.: US 6,320,954 B1
(45) Date of Patent: *Nov. 20, 2001

(54) COMMUNICATION SYSTEM CONSISTING OF AT LEAST TWO PRIVATE BRANCH EXCHANGES WITH A TEAM FUNCTION

(75) Inventor: Klaus Wille, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/254,154
(22) PCT Filed: Sep. 18, 1997
(86) PCT No.: PCT/DE97/02113
§ 371 Date: Feb. 26, 1999
§ 102(e) Date: Feb. 26, 1999
(87) PCT Pub. No.: WO98/15104
PCT Pub. Date: Apr. 9, 1998

(30) Foreign Application Priority Data

Sep. 30, 1996 (DE) ............................................. 196 40 266

(51) Int. Cl.[7] .................................................. H04M 7/00
(52) U.S. Cl. .................. 379/225; 379/219; 379/221.01; 379/216.01; 379/265.11
(58) Field of Search .................................. 379/225, 219, 379/220.01, 229, 230, 216.01, 221.01, 231, 232, 198, 265, 264, 309

(56) References Cited

U.S. PATENT DOCUMENTS

| | | | |
|---|---|---|---|
| 5,521,970 | | 5/1996 | Herrick et al. . |
| 5,670,950 | * | 9/1997 | Otsuka .................................. 379/225 |
| 5,764,750 | * | 6/1998 | Chau et al. ........................... 379/225 |
| 5,805,692 | * | 9/1998 | Oerlemans et al. .................. 379/225 |
| 5,818,921 | * | 6/1998 | Vander Meiden et al. .......... 379/225 |
| 5,841,839 | * | 11/1998 | Fogg et al. ............................ 379/225 |
| 5,867,568 | * | 2/1999 | Ackerman et al. ................... 379/225 |
| 5,966,437 | * | 10/1999 | Cox et al. .............................. 379/265 |
| 6,047,058 | * | 4/2000 | Wille .................................... 379/225 |

OTHER PUBLICATIONS

Dehlen, H., "Vernetzte TK–Anlagen Ohne Grenzen", NTZ Nachrichten Technische Zeitschrift, vol. 45, No. 9, Sep. (1992), pp. 714–716, 718–721.

Boom, W. et al, "New Group Feature Collection for Sopho–S ISPBXs", PTR Philips Telecommunication Review, vol. 51, No. 3, Dec. (1993), pp. 10–16.

Hochreuter, D. et al, "HICOM 300—Eine Vielfalt Neuer Möglichkeiten", Telcom Report, vol. 18, No. 5, Sep. (1995), pp. 265–267.

Korpi, Markku, "Global Vernetzt Mit Cornet D–Kanal–Protokoll Basiert Auf Nationalen Und Internationalen Normen", vol. 15, No. 6, Nov. (1992), pp. 284–287.

Fliedner, B., "Private Netze Auf Dem Weg in Die Zukunft", Telcom Report (Siemens) vol. 18, No. 2, (1995), pp. 75–77.

Fursat, J.C. et al, "Dynamic Virtual Communication Networks: The Telcom Europe Range", vol. 14, No. 1, Jan. (1992), pp. 39–48.

Eberl, L.H. et al, "Integrated ISDN D–Server for Intelligent Networking", Communications Technology for the 1900's and Beyond, Dallas, Nov. (1989), vol. 1 of 3, Nov. (1989), IEEE, pp. 539–542.

* cited by examiner

Primary Examiner—Ahmad Matar
Assistant Examiner—William J. Deane, Jr.
(74) Attorney, Agent, or Firm—Schiff Hardin & Waite

(57) ABSTRACT

A communication system consisting of at least two private branch exchanges with switching nodes is indicated, whereby in one of the private branch exchanges a team function controlling is provided for the realization of a team function between team terminal apparatuses. Team terminal apparatuses belonging to this team are connected to the second private branch exchange as remote subscribers, and are connected into the team function via a hotline connection between the first communication apparatus and the second communication apparatus. The team function controlling effects, for incoming calls, an automatic call forwarding to team substitute subscriber terminal apparatuses, if it recognizes that the hotline connection to the second private branch exchange is disturbed.

2 Claims, 1 Drawing Sheet

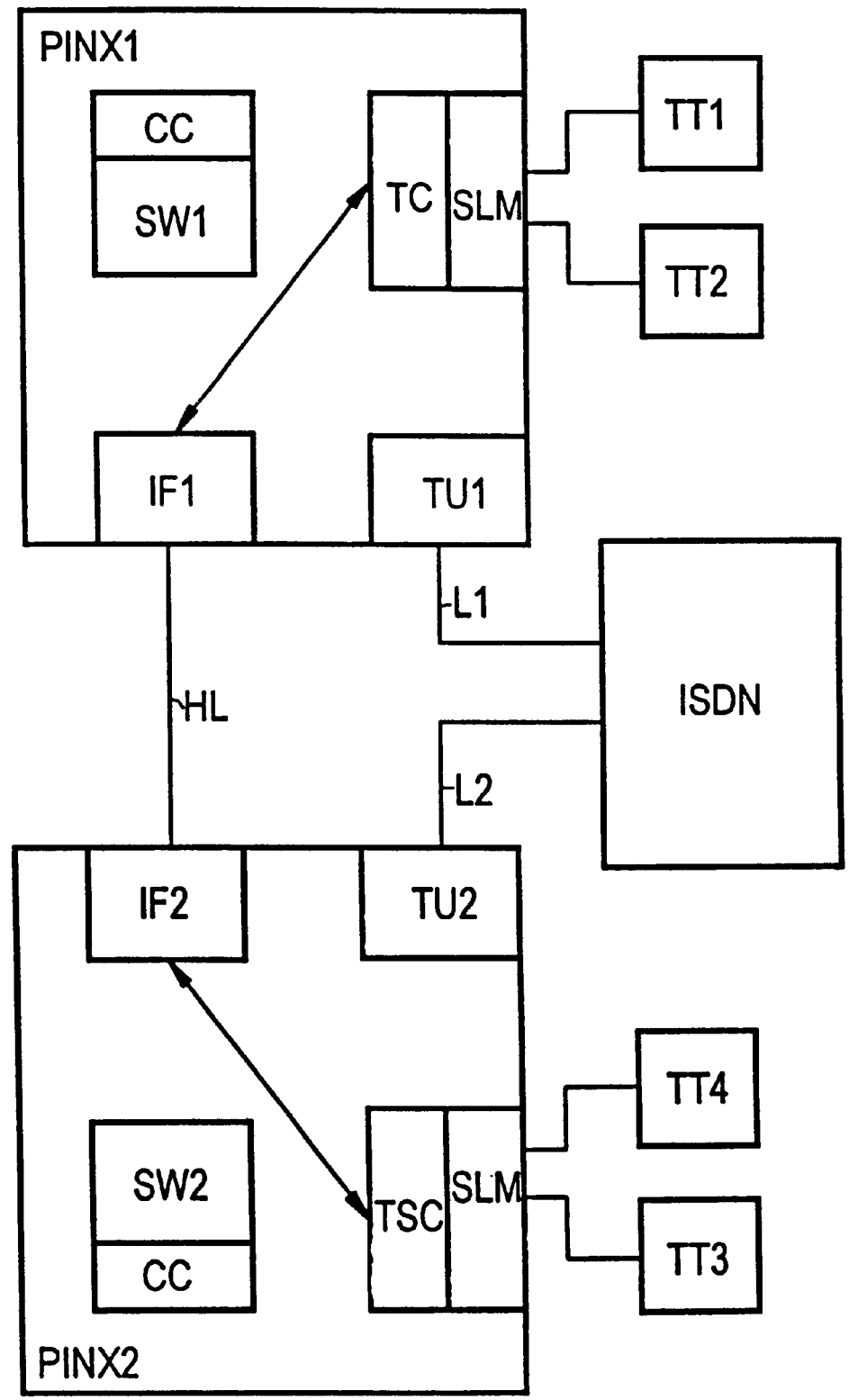

COMMUNICATION SYSTEM CONSISTING OF AT LEAST TWO PRIVATE BRANCH EXCHANGES WITH A TEAM FUNCTION

BACKGROUND OF THE INVENTION

The invention relates to a communication system having of at least two private branch exchanges, each having a switching control unit and at least one switching node, which is connected, via a network terminal means, to at least one higher-level communication network. It is connected, via at least one subscriber terminal means, to terminal. A team function control unit is provided in one of the private branch exchanges, which control unit controls, according to a team function, particular terminal apparatuses as team terminal apparatuses of a team. These apparatuses can be called via the switching node of this private branch exchange. The team function control unit occasions a signaling to other team terminal apparatuses dependent on the switching-oriented state of individual team apparatuses, and influences the switching-oriented state thereof.

One embodiment of private branch exchanges connected with one another, in at least one of which a team function is realized, is the private branch exchange HICOM 300, marketed commercially by Siemens AG. A known team function is for example the function 'call pickup,' in which incoming calls are displayed within a call pickup group of several terminal apparatuses and can be received at each terminal apparatus belonging to the call pickup group. Another known team function is the function 'PBX line group,' which can be reached at a special line group number. Each subscriber of a line group can also be called immediately via an individual call number. However, all subscribers are reached via the special line group number. The line group number is for example allocated to a master terminal apparatus.

A further known team function is the integrated secretarial unit, also called the executive secretary unit.

In known communication systems, all subscribers of a team are connected to a single private branch exchange, and are switched to a higher-level communication network via the same network terminal means.

SUMMARY OF THE INVENTION

The object of the invention is to provide a communication system in which a team function can also be realized with remote team subscribers.

It is provided according to the invention that at least one first team terminal apparatus of the team is connected immediately, via a subscriber terminal means, to a switching node of the first private branch exchange, and at least one second team terminal apparatus, as a remote subscriber of the team, is connected, via a subscriber terminal unit, to a switching node of the second private branch exchange as a terminal apparatus. This remote subscriber can be reached via the switching node of the first private branch exchange, a hotline connection between the first and the second private branch exchange, and a switching node of the second private branch exchange.

A team function controlling provided in the first private branch exchange effects, for incoming calls, an automatic call forwarding to team substitute subscriber terminal apparatuses, if it recognizes that the hotline connection to the second private branch exchange, and thus to the remote team terminal apparatuses, is disturbed.

The connection of team terminal apparatuses as remote subscribers via a hotline connection makes it possible to direct subscribers of a team within a company network to one another at any spatial distance.

Given a disturbed hotline connection to the second private branch exchange, an automatic call forwarding to team substitute subscriber terminal apparatuses ensures, particularly in the case in which a considerable portion of the terminal apparatuses that are remote from the team terminal apparatuses and are to be reached via the hotline, that the remaining team subscribers are not overloaded in case of failure of the hotline. This reduction of the team by the team subscribers of the remote terminal apparatuses, or, respectively, that the required service can still be performed without too great a delay [sic].

A particularly advantageous constructive form of an inventive communication system provides that the team function controlling acquires the availability of the hotline connection between the two private branch exchanges by checking the signaling connection required for the transparent transmission of the subscriber-to-subscriber messages for the remote subscribers. In this case, the availability check requires no B-channel resources. Moreover, no additional signaling is required.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE shows a schematic block representation of an inventive communication system.

DESCRIPTION OF THE PREFERRED EMBODIMENTS

The schematic block representation of the FIGURE shows a communication system consisting of a first private branch exchange PINX1 with a switching control CC, a first switching node SW1, a team function controlling TC and a first network terminal means TU1, connected with a higher-level communication network ISDN via a connection L1. A team terminal apparatus TT1 and a team substitute terminal apparatus TT2 are respectively connected to the first switching node SW1 via a subscriber terminal means SLM and are controlled by the team function controlling TC. The team function controlling TC moreover controls a connection to a first hotline interface IF1.

The second private branch exchange PINX2 contains a switching control CC and a second switching node SW2, to which among other things two team terminal apparatuses TT3 and TT4 are connected via a subscriber terminal means SLM. The second private branch exchange PINX2 is connected to the higher-level communication network ISDN via a second network terminal means TU2 and a connection L2.

A team function sub-controlling TSC controls the team terminal apparatuses TT3 and TT4, and moreover controls a connection to a second hotline interface IF2. The first hotline interface IF1 of the first private branch exchange PINX1 is connected, via a hotline connection HL, with the second hotline interface IF2 of the second private branch exchange PINX2.

The team function controlling TC provided in the first private branch exchange PINX1 effects, for incoming calls, an automatic call forwarding to team substitute subscriber terminal apparatuses TT2, if it recognizes that the hotline connection HL to the second private branch exchange PINX2, and thus to the remote team terminal apparatuses TT3, TT4, is disturbed.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication system comprising:

at least one first private branch exchange, having a switching controlling and at least one first switching node, which is connected, via a first network terminal, to at least one higher-level communication network, and is connected, via at least one subscriber terminal, to terminal apparatuses; at least one second private branch exchange with a switching controlling and at least one second switching node, connected via a second network terminal to the higher-level communication network, and connected via at least one subscriber terminal to terminal apparatuses the first private branch exchange having a team function controller, which controls, according to a team function, particular terminal apparatuses as team terminal apparatuses of a team, which apparatuses are callable via the first switching node, the team function controller effecting a signaling to other team terminal apparatuses dependent on a switching-oriented state of individual team apparatuses, and influencing the switching-oriented state thereof;

at least one first team terminal apparatus of the team connected immediately, via a subscriber terminal, to the first switching node as a terminal apparatus, and at least one second team apparatus connected, as a remote subscriber of the team, to the second switching node via a subscriber terminal unit, the at least one second team apparatus being reachable via the first switching node, a hotline connection between the first switching node and the second switching node, the team function controller of the first private branch exchange effecting for incoming calls an automatic call forwarding to team substitute subscriber terminal apparatuses, if the team function controller of the first private branch exchange recognizes that the hotline connection to the second private branch exchange and thus to the remote team terminal apparatuses is disturbed.

2. The communication system according to claim 1, wherein the team function controller of the first private branch exchange effecting checks an availability of the hotline connection between the first switching node and the second switching node by checking a signaling connection required for transparent transmission of subscriber-to-subscriber messages for remote, subscribers.

* * * * *